United States Patent
Brown et al.

(10) Patent No.: US 9,244,264 B1
(45) Date of Patent: Jan. 26, 2016

(54) GIMBALED MULTISPECTRAL IMAGING SYSTEM AND METHOD

(71) Applicant: Sandia Corporation, Albuquerque, NM (US)

(72) Inventors: Kevin H. Brown, Albuquerque, NM (US); Seferino Crollett, Albuquerque, NM (US); Tammy D. Henson, Albuquerque, NM (US); Mathew Napier, Albuquerque, NM (US); Peter G. Stromberg, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 14/303,355

(22) Filed: Jun. 12, 2014

Related U.S. Application Data

(60) Provisional application No. 61/835,060, filed on Jun. 14, 2013.

(51) Int. Cl.
   *G01J 5/02* (2006.01)
   *G02B 23/12* (2006.01)
   *G02B 23/02* (2006.01)

(52) U.S. Cl.
   CPC ............... *G02B 23/12* (2013.01); *G02B 23/02* (2013.01)

(58) Field of Classification Search
   CPC ........... G02B 17/0615; G02B 17/0808; G02B 23/12; G02B 23/02; G02B 27/10; G02B 17/0816; G02B 27/1006; G01J 2003/1213; G01J 2005/607; G01J 3/0243
   USPC ...................................................... 250/353
   See application file for complete search history.

(56) References Cited

U.S. PATENT DOCUMENTS

| | | | | |
|---|---|---|---|---|
| 4,215,273 A * | 7/1980 | Frosch et al. | ................ | 250/347 |
| 4,746,798 A * | 5/1988 | Amon et al. | ............ | 250/339.02 |
| 5,528,418 A * | 6/1996 | Bowman, Jr. | ................ | 359/400 |
| 5,631,770 A * | 5/1997 | Jarmuz | ........................ | 359/351 |
| 5,781,336 A | 7/1998 | Coon et al. | | |
| 6,208,459 B1 | 3/2001 | Coon et al. | | |
| 6,950,243 B2 | 9/2005 | Wiese et al. | | |
| 7,148,974 B1 * | 12/2006 | Schmitt et al. | ................ | 356/622 |
| 8,605,349 B2 * | 12/2013 | Maraviglia et al. | ......... | 359/212.2 |
| 2003/0218686 A1 * | 11/2003 | Lundgren | ..................... | 348/344 |
| 2004/0021852 A1 * | 2/2004 | DeFlumere | ................ | 356/141.1 |
| 2005/0030237 A1 * | 2/2005 | Wong et al. | ................... | 343/757 |
| 2008/0018995 A1 * | 1/2008 | Baun | ............................ | 359/399 |
| 2009/0015914 A1 * | 1/2009 | Duncan et al. | ................ | 359/399 |
| 2011/0228383 A1 | 9/2011 | Cook | | |
| 2012/0170024 A1 * | 7/2012 | Azzazy et al. | ................... | 356/51 |
| 2013/0107360 A1 * | 5/2013 | Kurtz et al. | .................... | 359/434 |
| 2013/0193315 A1 * | 8/2013 | Shemesh | ...................... | 250/226 |
| 2013/0271766 A1 | 10/2013 | Richards | | |
| 2015/0059567 A1 * | 3/2015 | Fox et al. | ..................... | 89/41.19 |

* cited by examiner

*Primary Examiner* — David J Makiya
*Assistant Examiner* — Taeho Jo
(74) *Attorney, Agent, or Firm* — Michael A. Beckett

(57) ABSTRACT

A gimbaled multispectral imaging system and method is described herein. In an general embodiment, the gimbaled multispectral imaging system has a cross support that defines a first gimbal axis and a second gimbal axis, wherein the cross support is rotatable about the first gimbal axis. The gimbaled multispectral imaging system comprises a telescope that fixed to an upper end of the cross support, such that rotation of the cross support about the first gimbal axis causes the tilt of the telescope to alter. The gimbaled multispectral imaging system includes optics that facilitate on-gimbal detection of visible light and off-gimbal detection of infrared light.

15 Claims, 4 Drawing Sheets

GIMBALED MULTISPECTRAL IMAGING SYSTEM AND METHOD

RELATED APPLICATION

This application claims priority to U.S. Provisional Patent Application No. 61/835,060, filed on Jun. 14, 2013, and entitled "SCALABLE, GIMBALED MULTISPECTRAL IMAGING SYSTEM AND METHOD", the entirety of which is incorporated herein by reference.

STATEMENT OF GOVERNMENTAL INTEREST

This invention was developed under Contract DE-AC04-94AL85000 between Sandia Corporation and the U.S. Department of Energy. The U.S. Government has certain rights in this invention.

BACKGROUND

A conventional multispectral imaging system includes: 1) optical elements (e.g., mirrors, lenses, etc.) that are configured to manipulate and direct light; 2) filters that are configured to filter particular wavelengths of light; 3) detectors that are configured to generate signals that are indicative of amplitudes of light at the particular wavelengths; and 4) processing circuitry that is configured to generate meaningful output based upon the signals generated by the detectors. The optical elements, filters, and detectors are selected and arranged relative to one another to allow for analysis of wavelengths over multiple spectrums of light, ranging from the visible spectrum (as low as ~400 nanometers) up to long wave infrared (up to as high as ~12 micrometers).

In an example, a conventional multispectral imaging system can be gimbaled, thereby allowing for alteration of a field of view of such an imaging system. A conventional gimbaled multispectral imaging system, however, tends to be relatively expensive to design and build. Further, a design of a conventional gimbaled multispectral imaging system is typically only well-suited for a small set of wavelengths of light, aperture sizes, detector configurations, and processing configurations. That is, the design is not readily extendible; if it is desirable to analyze other ranges of wavelengths, other aperture sizes, other detector configurations, or other processing configurations, then an entirely new design is typically generated. Moreover, depending on the application, performance of a gimbaled multispectral imaging system can be limited by the weight and size of the system.

To reduce the size and weight of a multispectral imaging system, single-aperture (e.g., primary mirror) designs have been proposed, where the multispectral imaging system includes beam splitters in optical communication with the primary mirror, and respective detectors in optical communication with the beam splitters. The primary mirror is configured to form a light bundle, and the beam splitters progressively split the light bundle by wavelength (e.g., such that each beam splitter directs a respective wavelength of interest to a respective detector).

The single aperture and beam splitter approach described above leads to several complications: 1) a potential need for different focal lengths for various optical wavelengths with a single front end optical design; 2) a longer beam path may be needed to have room to split the light bundle and change focal lengths, which often requires a re-imaging system, which reduces performance; 3) optically efficient beam splitters with sharp transitions between transmission and reflection are required; 4) the potential need for many optical elements which both increases complexity and cost but also reduces performance in the form of reduced transmission and/or increased self-emission; and 5) very tight alignment tolerances are needed, especially for the visible elements (to maintain performance).

SUMMARY

The following is a brief summary of subject matter that is described in greater detail herein. This summary is not intended to be limiting as to the scope of the claims.

Described herein are various technologies pertaining to a gimbaled multi-spectral imaging system. An exemplary gimbaled multi-spectral imaging system (imaging system) comprises two mirrors and a beam splitter, wherein the beam splitter is configured to facilitate analysis of different ranges of wavelengths. For instance, the imaging system may include two detectors: 1) a first detector that is configured to detect at least one wavelength (e.g., a range of wavelengths) in the visible spectrum; and 2) a second detector that is configured to detect at least one wavelength (e.g., a range of wavelengths) in the infrared (IR) spectrum.

With more particularity, the imaging system includes a support frame that supports a gimbaled hollow cross support. The cross support defines a first gimbal axis and a second gimbal axis, wherein the cross support is rotatable in the support frame about the first gimbal axis. The imaging system includes a telescope that is fixed to an upper end of the cross support. In an exemplary embodiment, the telescope can rotate about both the first and second gimbal axes (e.g., the telescope rotates about the first gimbal axis when the cross structure rotates about the first gimbal axis, and the telescope is rotatably fixed to the upper end of the cross support to allow for rotation about the second gimbal axis). The telescope includes two mirrors and a beam splitter, which is positioned between the two mirrors. With more particularity, the telescope includes an optical axis that extends along the length of the telescope and approximately centrally through a cross section of the telescope. A primary mirror and a secondary mirror are positioned on the optical axis of the telescope, and spaced apart from one another by a suitable distance. The beam splitter is positioned between the primary mirror and the secondary mirror, at an intersection of the optical axis of the telescope and the second gimbal axis. The primary mirror has a clearance hole therethrough, wherein the optical axis of the telescope extends through the clearance hole. The telescope further comprises a first detector positioned on the optical axis of the telescope, such that the primary mirror is between the beam splitter and the first detector. In an exemplary embodiment, the first detector can be configured to detect light in the visible through very near infrared (VNIR) spectrums.

The imaging system can also include a fold mirror that is positioned at the intersection of the first gimbal axis and the second gimbal axis. A second detector is positioned in a cold space that is off-gimbal (e.g., where the cold space is included in a base unit that is fixed to the stationary support frame), and is configured to detect, for example, short-wave IR (SWIR) through long-wave IR (LWIR) light.

In operation, light of a scene enters the telescope through an opening of a telescope baffle. The telescope further includes an aperture stop, which is positioned proximate to the primary mirror between the telescope baffle and the primary mirror. The aperture stop is configured to control the amount of scene light collected by the telescope. Light passes through the aperture stop and travels to the primary mirror. The primary mirror reflects and focuses light towards a first focal point that is behind the secondary mirror (from the perspective of the primary mirror) on the optical axis of the telescope. The secondary mirror further reflects and focuses the light back towards the primary mirror towards a second focal point that is on the optical axis, thereby forming a light bundle. The beam splitter receives the light bundle, and splits the light bundles into two light bundles: 1) a first light bundle that includes visible-VNIR light; and 2) a second light bundle that includes SWIR-LWIR light. The first light bundle exits the beam splitter along the optical axis of the telescope and travels through the clearance hole of the primary mirror towards the first detector. Thus, the first detector outputs a first signal that is indicative of amplitudes of light having respective wavelengths in the first light bundle. The second light bundle is reflected from the beam splitter along the second gimbal axis through the hollow cross support. The second light bundle is reflected by the fold mirror that is positioned at the intersection of the first gimbal axis and the second gimbal axis. Thus, the fold mirror reflects the second light bundle along the first gimbal axis.

The second light bundle (optionally) passes through optics (e.g., lenses, filters, ... ) and the cold space referenced above, wherein the second detector is positioned in the cold space. The second detector then generates a signal that is indicative of an intensity of light of at least one wavelength in the second light bundle. It can therefore be ascertained that the imaging system divides uncooled, shorter wavelength optical detectors from the longer wavelength infrared detectors that require active or passive cooling.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
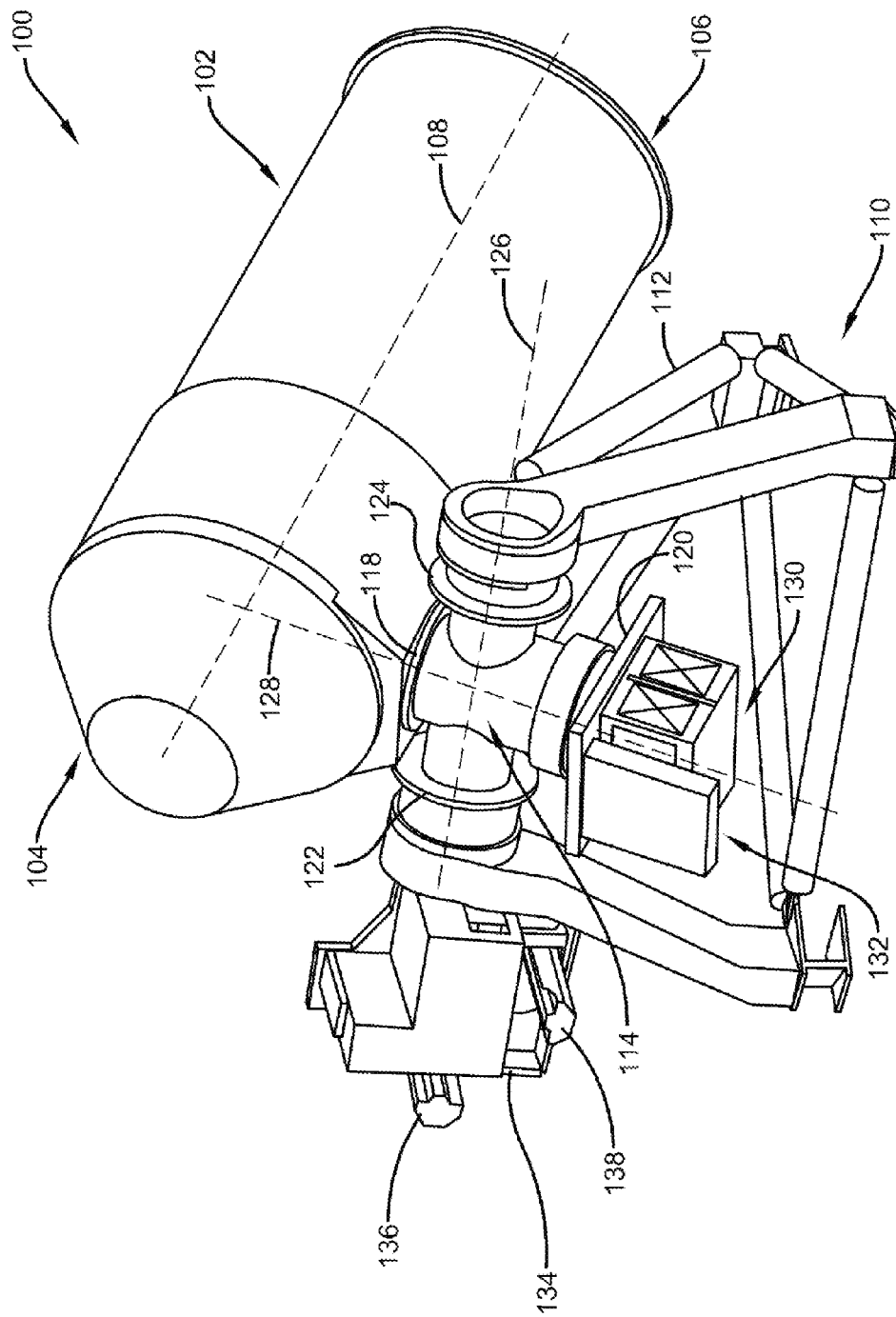
FIG. 1 is an isometric view of an exemplary gimbaled multispectral imaging system.

Various technologies pertaining to a gimbaled multispectral imaging system (referred to herein as an "imaging system") are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

With reference to FIG. 1, an isometric view of an exemplary imaging system 100 is illustrated. The imaging system 100 comprises a telescope 102 that has a proximal end 104 and a distal end 106. The telescope 102 has an optical axis 108 that extends along a length of the telescope 102 and through centers of respective cross-sections of the proximal end 104 and the distal end 106 of the telescope 102.

The imaging system 100 also comprises a gimbal 110 that has a first gimbal axis 126 and a second gimbal axis 128 (e.g., where the first gimbal axis 126 is orthogonal to the second gimbal axis 128). The gimbal 110 facilitates rotating the telescope 102 about the first gimbal axis 126 and the second gimbal axis 128. With more particularity, the gimbal 110 comprises a support frame 112, which supports a hollow cross support 114. In an example, the support frame 112 can be made of titanium and carbon fiber. The cross support 114 includes an upper end 118, a lower end 120 opposite the upper end 118, a first side end 122, and a second side end 124 positioned opposite the first side end 122. The cross support 114 defines the first gimbal axis 126 and the second gimbal axis 128. The first gimbal axis 126 extends through centers of respective cross-sections of the first side end 122 and the second side end 124 of the cross support 114, and the second gimbal axis 128 extends through centers of respective cross-sections of the upper end 118 and the lower end 120 of the cross support 114. The cross support 114 is loosely coupled to the support frame 112, such that the cross support 114 is rotatable about the first gimbal axis 126. Additionally, the cross support 114 includes mechanics internal thereto (not shown) that rotate about the second gimbal axis 128, thereby allowing elements coupled to those mechanics to rotate about the second gimbal axis 128.

The telescope 102 is removably and rotatably attached to the above-referenced mechanics at the upper end 118 of the cross support 114; thus, the telescope can rotate about both the first gimbal axis 126 and the second gimbal axis 128. The ability to rotate the telescope 102 about the first gimbal axis 126 and the second gimbal axis 128 facilitates sweeping the field of view of the telescope 102 about a desired field of regard.

The imaging system 100 can further comprise an inertial reference unit (IRU) 130 that is coupled to the mechanics at the bottom end 120 of the cross support 114. Therefore, the IRU 130 can also rotate about the first gimbal axis 126 and the second gimbal axis 128. The IRU can be referred to as being "on-gimbal", since it is rotatable about both the first gimbal axis 126 and the second gimbal axis 128. The IRU 130 comprises gyros that measure the rotation of the IRU 130, and as the IRU 130 is attached to the telescope 102, it also measures the rotation of the telescope 102. Such data can be employed to reduce jitter induced by vibration or other movement. Additionally, a first electronics unit 132 can be coupled to the mechanics at the bottom end 120 of the cross support 114, wherein the first electronics unit 132 is configured to generate image data, for example. Moreover, weights can (optionally) be coupled to the bottom end 120 of the cross support 114, wherein the IRU 130, the first electronics unit 132, and the weights can be employed to mass-balance the imaging system 100. That is, mass of the IRU 130, the first electronics unit 132, and the weights can be configured to at least partially offset the mass of the telescope 102.

The imaging system 100 can further optionally comprises a cold space 134 that is attached to the support frame 112 proximate to the first side end 122 of the cross support 114. As the cold space 134 is attached to the stationary support frame 112 (and thus does not rotate about either the first gimbal axis 126 or the second gimbal axis 128), the cold space 134 can be referred to as being "off-gimbal." As will be described in greater detail below, the cold space 134 can include a cold stop, optical elements, and a detector that is configured to detect infrared (IR) light. The imaging system 100 can further optionally include cooling elements 136 and 138 positioned proximate to the cold space 134 but mechanically detached from the cold space 134, thereby insulating the cold space 134 and the optics therein from vibrations induced by the cooling elements 136 and 138. In an example, the cooling elements 136 and 138 can be cryo-coolers, thermoelectric coolers, etc. Further, the cooling elements 136 and 138 can cause the interior of the cold space to reach cryogenic temperatures. In some embodiments, it may not be desirable to cool the temperature of the cold space 134 to cryogenic temperatures. In other embodiments, it may not be desirable to provide any cooling to the cold space 134.

Figure 2:
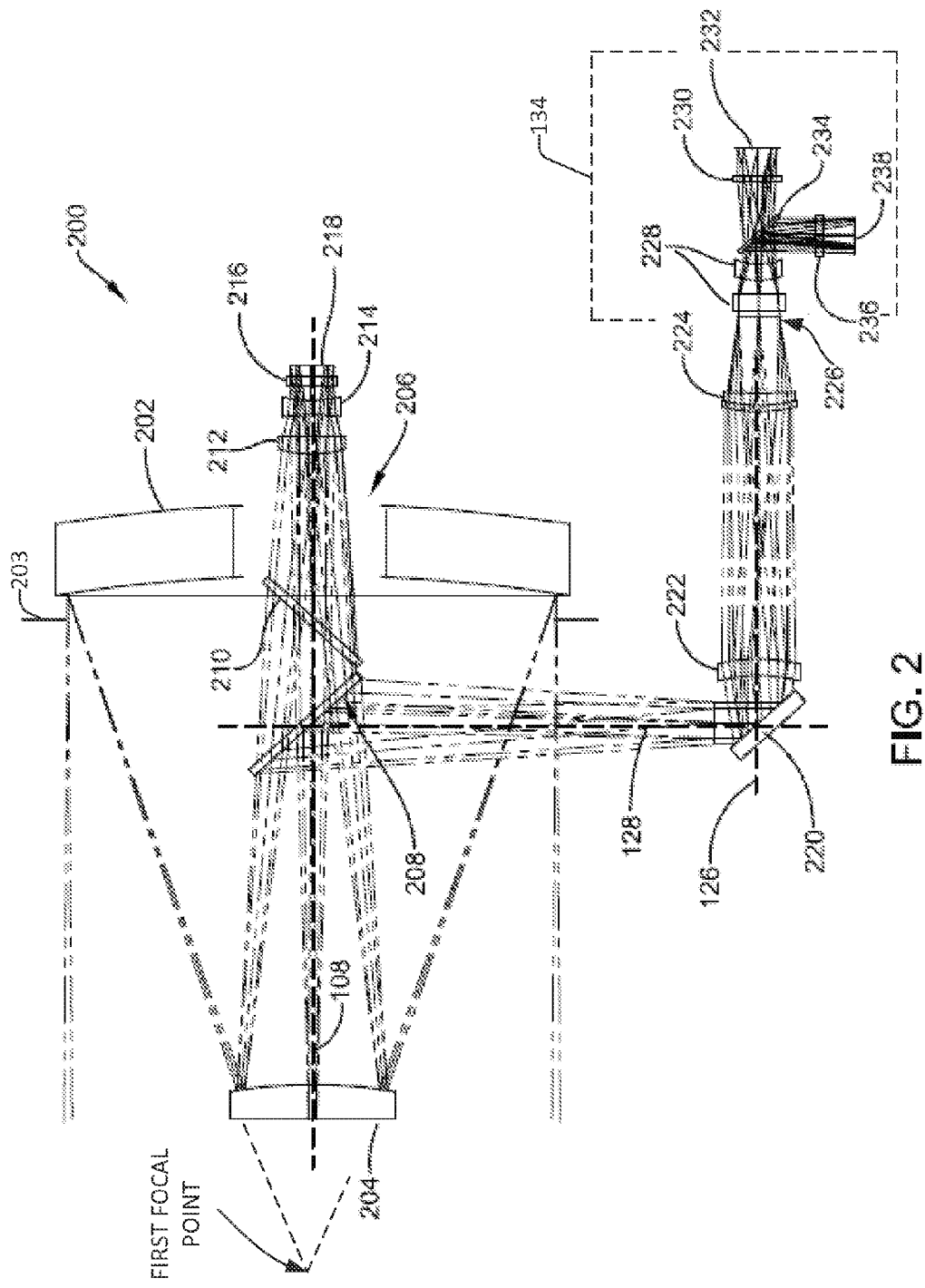
FIG. 2 is a functional block diagram that illustrates traversal of light through the exemplary gimbaled multispectral imaging system.

With reference to FIG. 2, a functional block diagram 200 that illustrates traversal of light through the imaging system 100 is presented. The telescope 102 includes a primary mirror 202 positioned near the proximal end 104 of the telescope 102, wherein the primary mirror 202 is symmetric about the optical axis 108 of the telescope 102 and has a first focal point on the optical axis 108 of the telescope 102. The telescope 102 also includes an aperture stop 203 located in close proximity to the primary mirror 202. The aperture stop diameter can range from between about ten centimeters to about 1 meter. The telescope 102 also includes a secondary mirror 204 positioned near the distal end 106 of the telescope 102, wherein the secondary mirror 204 is symmetric about the optical axis 108 of the telescope and has a second focal point on the optical axis 108 of the telescope 102. The aperture stop 203 is positioned between the primary mirror 202 and the secondary mirror 204. The second gimbal axis 128 extends between the primary mirror 202 and the secondary mirror 204. A distance between the primary mirror 202 and the secondary mirror 204 can be selected based upon an application of the imaging system 100 and focal lengths of the mirrors 202 and 204. As shown in FIG. 2, the first focal point of the primary mirror 202 is behind the secondary mirror (from the perspective of the primary mirror 202) and the second focal point of the secondary mirror 204 is behind the primary mirror 202 (from the perspective of the secondary mirror 204). The primary mirror 202 has a clearance hole 206 that extends through the primary mirror 202, wherein the optical axis 108 of the telescope 102 extends through the clearance hole 206.

The telescope 102 further comprises a beam splitter 208 positioned at an intersection of the optical axis 108 of the telescope 102 and the second gimbal axis 128, and thus between the primary mirror 202 and the secondary mirror 204. The beam splitter 208 is configured to cause a light received from the secondary mirror 204 having wavelengths in a first range to pass therethrough (symmetrically about the optical axis 108 of the telescope 102), and is configured to cause light received from the secondary mirror 204 having wavelengths in a second range to be reflected therefrom (symmetrically about the second gimbal axis 128). In an example, the first range can include light in the visible and very near IR (VNIR) spectrums, and the second range can include light in the IR spectrum. With still more detail, the first range can include wavelengths between 400 nanometers and 1.2 micrometer, and the second range can include wavelengths between 1.4 micrometers and 12 micrometers. The telescope 102 can also optionally include a corrector plate 210 that is positioned on the optical axis 108 of the telescope 102 and between the beams splitter 208 and the primary mirror 202. The corrector plate 210 is configured to correct aberrations in light that passes through the beam splitter 208, wherein the aberrations may be caused by the beam splitter 208.

The telescope 102 can further optionally comprise visible light field lenses 212 and 214, which are positioned between the primary mirror 202 and the proximal end 104 of the telescope 102 and on the optical axis 108 of the telescope 102. The visible light field lenses 212 and 214 are configured to focus visible light onto a focal plane. A filter 216 is configured to further filter unwanted light from light passing through the visible light field lenses 212 and 214. In an exemplary embodiment, the filter 216 can be a fixed filter that allows visible light in one band (e.g., red, green, or blue) to pass therethrough. In another example, the filter 216 can be a filter wheel that includes multiple filters, wherein the filter wheel allows visible light in multiple bands (e.g., red, green, and blue) to be passed therethrough and combined.

The telescope 102 also includes a first detector 218 that is positioned on the optical axis 108 of the telescope 102 and optically coupled to the filter 216. The first detector 218 is configured to generate a value that is indicative of intensity of light of at least one wavelength (e.g., in a range of wavelengths) that passes through the filter 216. In an exemplary embodiment, the first detector 218 can be electrically coupled to the first electronics unit 132, wherein the first electronics unit 132 can generate a first image, for instance, based upon values generated by the first detector 218.

The imaging system 100 also includes a fold mirror 220 that is positioned in the interior of the hollow cross support 114 at the intersection of the first gimbal axis 126 and the second gimbal axis 128. The intersection of the first gimbal axis 126 and the second gimbal axis 128 can be altered relative to the telescope 102. As indicated previously, the beam splitter 208 is configured to reflect light with wavelengths in the second range along the second gimbal axis 128. The fold mirror 220 is configured to redirect the light such that the light is directed along the first gimbal axis 126. A lens 222 is optionally positioned in the interior of the cross support 114 and proximate to the fold mirror 220, and acts to focus light reflected from the fold mirror 220 along the first gimbal axis 126. Further, in an exemplary embodiment, the fold mirror 220 can be mounted to a mounting mechanism (not shown) that allows for the fold mirror 220 to be rotated on the first gimbal axis 126. Moreover, the lens 222 can be mounted to the mounting mechanism, such that the lens 222 can be rotated on the first gimbal axis 126. Such a configuration can facilitate enablement of line of sight (LOS) across the field of regard (FOR).

Lenses 224 are positioned on the first gimbal axis 126 in the interior of the cross structure 114, proximate to the first end 122 of the cross structure 114. The lenses 224 are optically coupled to the lens 222, and are configured to focus light and form an image of the aperture stop at an exit pupil of the second light bundle.

As indicated previously, the cold space 134 is attached to the stationary support frame 112, and is thus "off-gimbal". The cold space 134 includes an aperture stop 226 placed at the exit pupil (e.g., a Lyot stop) that is optionally cooled (e.g., to cryogenic temperatures), and therefore can be referred to as a cold stop 226. The cold space 134 further optionally includes a set of field lenses 228 that are optically coupled to the cold stop 226, wherein the field lenses 228 focus light exiting the cold stop 226 onto an IR focal plane. The cold space 134 can further include an IR filter 230 that receives IR light exiting the field lenses 228. The IR filter 230 can be a fixed filter or a filter wheel. An IR detector 232, which is configured to detect intensity (amplitude) of light of at least one wavelength in the IR spectrum, is optically coupled to the IR filter 230, and receives IR light that exits the IR filter 230. The IR detector 232 can generate a value that is indicative of such intensity. A second electronic unit 304 that is external to the cold space 134 but is electronically coupled to the IR detector 232 is configured to perform an operation (e.g., generate an IR image) based upon the value generated by the IR detector 232.

The cold space 134 can further optionally comprise a second beam splitter 234 that is positioned between the field lenses 228 and the filter 230. Inclusion of the second beam splitter 234 in the cold space 134 allows for multiple ranges of wavelengths of IR light to be subjected to analysis. Specifically, the second beam splitter 234 can be configured to allow light having wavelengths in a first range of IR wavelengths to pass therethrough while reflecting light having wavelengths in a second range of IR wavelengths. Additional wavelength ranges, in both visible and IR spectrums, can be subjected to analysis by including additional beam splitters and corresponding detectors in the imaging system 100. When the cold space 134 includes the second beam splitter 234, the cold space 134 can further include a second IR filter 236 that receives IR light reflected from the second beam splitter 234, wherein the second IR filter 236 can be a fixed filter or a filter wheel. A second IR detector 238 generates a value that is indicative of intensity of light of at least one wavelength that passes through the second IR filter 236, and the second electronic circuit referenced above can generate a second IR image based upon the value generated by the second IR detector 238.

Operation of the imaging system 100 is now described. The telescope 102 is oriented to have a desired field of view in a field of regard—for instance, motors can be configured to drive the gimbal 110 such that the telescope 102 is rotated about the first gimbal axis 126 as desired, and further rotated about the second gimbal axis 128 as desired. Light (which can include visible and IR light) enters the telescope 102 at the distal end 106 at the baffle opening (not shown). The light travels through the interior of the telescope 102, passes through the aperture stop 203, and reaches the primary mirror 202. The primary mirror 202 reflects and focuses the light towards the first focal point, symmetrically about the optical axis 108. The light then reaches the secondary mirror 204, which reflects and focuses the light towards the second focal point, symmetrically about the optical axis 108. The light reflected by the secondary mirror 204 can be referred to as a light bundle.

The light bundle impacts the beam splitter 208, which effectively partitions the light bundle into a first light bundle (visible and VNIR light) and a second light bundle (IR light). The beam splitter 208 allows the first light bundle to pass therethrough, symmetrically about the optical axis 108 of the telescope. The beam splitter 208 reflects the second light bundle, symmetrically about the second gimbal axis 128.

Referring to the first light bundle, the corrector plate 210 corrects aberrations in the first light bundle caused by the beam splitter 208. The (corrected) first light bundle then passes through the clearance hole 206 in the primary mirror 202, where it is directed to the filter 216 by the visible light field lenses 212 and 214. The filter outputs a first filtered signal, which comprises light in the visible and/or VNIR spectrum, and the detector 218 receives the first filtered signal. The detector 218 generates values that are indicative of amplitudes of one or more wavelengths in the first filtered signal, and the electronics 132 can generate an image based upon the values generated by the detector 218. It is to be ascertained that the imaging system 100 is not a re-imager with respect to visible light.

Referring to the second light bundle, the second light bundle exits the telescope 102 and enters the cross support 114 at the upper end 118, travelling symmetrically about the second gimbal axis 128. The fold mirror 220 reflects the second light bundle along the first gimbal axis 126, and the lens 222 focuses the second light bundle. The lenses 224 further direct the second light bundle to the cold stop 226. The field lenses 228 focus the second light bundle onto the second beam splitter 234, which partitions the second light bundle into two light bundles: a third light bundle that includes light having wavelengths in a first range of wavelengths in the IR spectrum; and a fourth light bundle that includes light having wavelengths in a second range of wavelengths in the IR spectrum.

The third light bundle (which passes through the second beam splitter 234) is received at the first IR filter 230, which outputs first filtered light. The first IR detector 232 receives the first filtered light, and detects intensities of light in the first filtered light. A first IR image can be constructed based upon the intensities detected by the first IR detector 232. The fourth light bundle (which is reflected by the second beam splitter 234) is received at the second IR filter 236, which outputs second filtered light. The second IR detector 238 receives the second filtered light, and the second IR detector 238 detects intensities of light in the second filtered light. In an example, a second IR image can be constructed based upon the intensities detected by the second IR detector 238.

Figure 3:
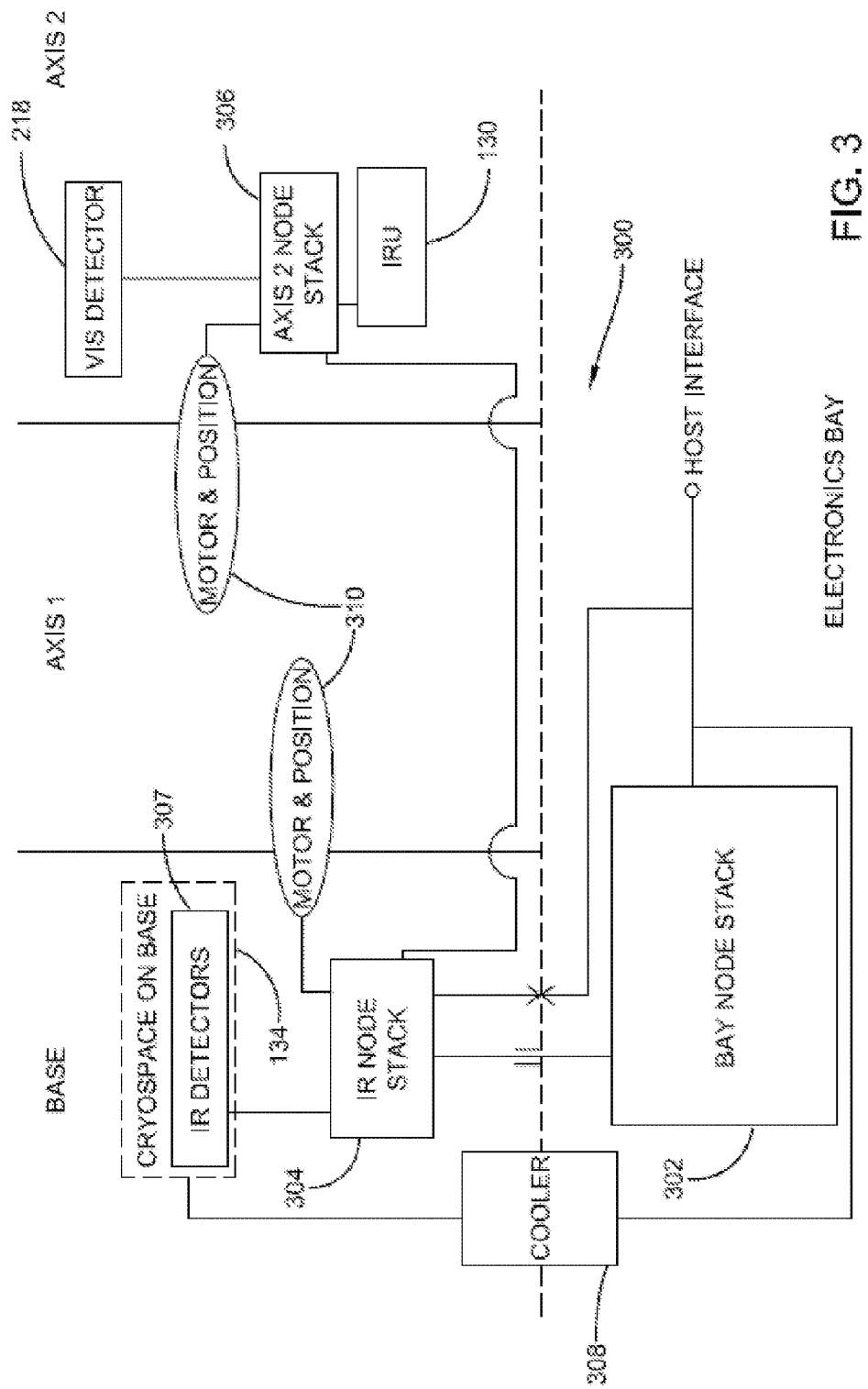
FIG. 3 is a functional block diagram of portions of the gimbaled multispectral imaging system.

Now referring to FIG. 3, a functional block diagram 300 illustrating various aspects of the imaging system 100 is presented. The imaging system 100 includes a plurality of processing stacks: 1) a bay node stack 302; 2) an IR node stack 304; and 3) a second gimbal axis node stack 306. As indicated, the cold space 134, which includes IR detectors 307 (e.g., the IR detectors 232 and 238), is positioned off-gimbal and coupled to the support frame 112 of the gimbal 110. The support frame 112 can also be referred to as a "base". A cooler 308 (e.g., one of the cooling elements 136 or 138) can be mechanically decoupled from the IR detectors 307, such that vibration of the cooler 308 does not induce jitter. The bay node stack 302 is generally configured to drive the cooler 308, receive output from the IR node stack 304 and the second gimbal axis node stack 306, and communicate with an external computing apparatus by way of a host interface.

As discussed previously, the IRU 130, the first electronics unit 132 (including the second gimbal axis node stack 306), and the visible detector 218 can be located on-gimbal, and can rotate about the first gimbal axis 126 and the second gimbal axis 128. The second gimbal axis node stack 306 (e.g., comprised by the first electronics unit 132) receives motor and position data 310, and can generate an output image based upon data generated by the visible detector 218 and the motor and position data 310. Similarly, the IR node stack 304 (e.g., comprised by the second electronics unit) receives data output by the IR detectors 307 and the motor and position data 310, and can generate IR image(s) based upon such data. The bay node stack 302 receives image data from the IR node stack 304 and the second gimbal axis node stack 306, and can transmit the image data to a host computing device. In another exemplary embodiment, the data can be processed at the bay node stack 302, the IR node stack 304, and/or the second gimbal axis node stack 306. For example, the data can initially be processed at the IR node stack 304 and/or the gimbal node stack 306, wherein the node stacks 304 and 306 are configured to generate images. The bay node stack 302 can receive the images, sum the images together, decimate the images to smaller resolutions, process the image to extract relevant information from a frame, etc.

The imaging system 100 shown and described herein has numerous advantages over conventional designs. For example, the design of the imaging system 100 yields diffraction limited performance and allows the IR detectors 232 and 238 to be off-gimbal. Having longer wavelengths (infrared) off-gimbal has multiple advantages: the focal length can be different between the visible and infrared channels, it allows the ability to have multiple infrared focal planes, neither the cryo-cooling nor the heat rejection has to cross the gimbal, and the cooling elements 136 and 138 can be placed in close proximity to the cold space 134 but mechanically isolated from the IR detectors 232 and 238. Thus, the design of the imaging system 100 set forth above is thermally efficient and reduces mass and power by reducing thermal parasitics between the cooling elements 136 and 138 and the detectors 232 and 238 compared to conventional imaging systems. Further, the design results in reduction of jitter unto the IR detectors 232 and 238 from the cooling elements 136 and 138. Yet another advantage, in some embodiments, is the ability to have an extended field of regard; for example, light transmitted to the sensors can have about 135 degrees of capability on the first gimbal axis 126 and +/−45 degrees on the second gimbal axis 128.

The design uses glasses that are relatively easy to work with and reduces the number of optical elements in the imaging system 100 relative to conventional designs; this results in improvements in transmission and reduction in self-emission related to the conventional designs. Further, alignment tolerances are relatively loose for an optical system (they are still optical quality but do not require any special efforts like many systems). These features reduce both the cost and schedule of manufacturing, aligning and integrating the optical elements relative to conventional designs.

The node-based design of the electronics of the imaging system 100, shown in FIG. 3, allows electronics to be placed in close proximity to the detectors (both visible and IR), and allows the electronics to be positioned as desired on the sensor to enable effective packaging and to use the electronics as balance mass for the gimbal (and reduce cabling). The node-based architecture also enables support for different detectors by changing interface boards while retaining all of the core processing boards.

To reduce development and production costs and to increase flexibility, an exemplary embodiment includes node-based electronics with 2 node types and relatively simple interface boards to the detectors. The nodes comprise a configurable core with a built in high bandwidth network interface. The network interface allows for a single data cable to connect two node stacks, thus reducing the cabling for the system. The first node type is architected to support standard processor logic functions (embedded processors, interface control, command/control, etc.) and the second node type is architected to support mission (detector) data processing with data storage. These nodes are combined into node stacks, and a single node stack can have either type of node or a combination of nodes depending on what is needed, but the nodes remain functionally independent. The nodes are generic and are based on configurable cores so a single node can be specialized to meet specific needs without redesigning the hardware. The detectors are interfaced through an interface module that simply translates the data interface between the detector and the data processing node. This allows for a system designed for one detector to be able to use a newer (different) detector without changing the node stacks and only changing the interface module. As an additional benefit, the use of configurable cores allows reprogramming after deployment of the sensor to allow new capabilities and new missions to be added at any time. The inherent nature of the node-based design with a high speed network allows processing function to be independent of physical location. By utilizing a node based aspect within a multispectral gimbaled system, the electronics can be placed close to the detectors and used as balance for the gimbal. Therefore, the node-base architecture reduces weight of the system relative to conventional imaging systems, reduces the number and complexity of the cabling (e.g., compared to conventional imaging systems), supports processing growth, and allows for support of different detectors via a simple interface board change.

By design, the electronic nodes can be placed anywhere on the sensor as needed to optimize the overall sensor with a relatively small amount of cabling required. Examples include the ability of adding or removing electronics from the gimbal to provide balance, moving electronics to or from a separate electronics cabinet or bay to minimize the footprint on the outside, etc. This facilitates having a single scalable architecture that can support different number and types of detectors as well as different aperture size. For gimbaled multi-spectral systems, cabling is a major complexity and can be a major contributor to weight. In the imaging system 100, a fiber optic network can be used for data processing within the sensor. A copper cable crosses the gimbals to provide power and some limited analog state of health data when the system is unpowered. The use of fiber for the mission data reduces the weight, allows for very high data rates within the sensor network, and minimizes EMI (which can be important for some applications).

Figure 4:
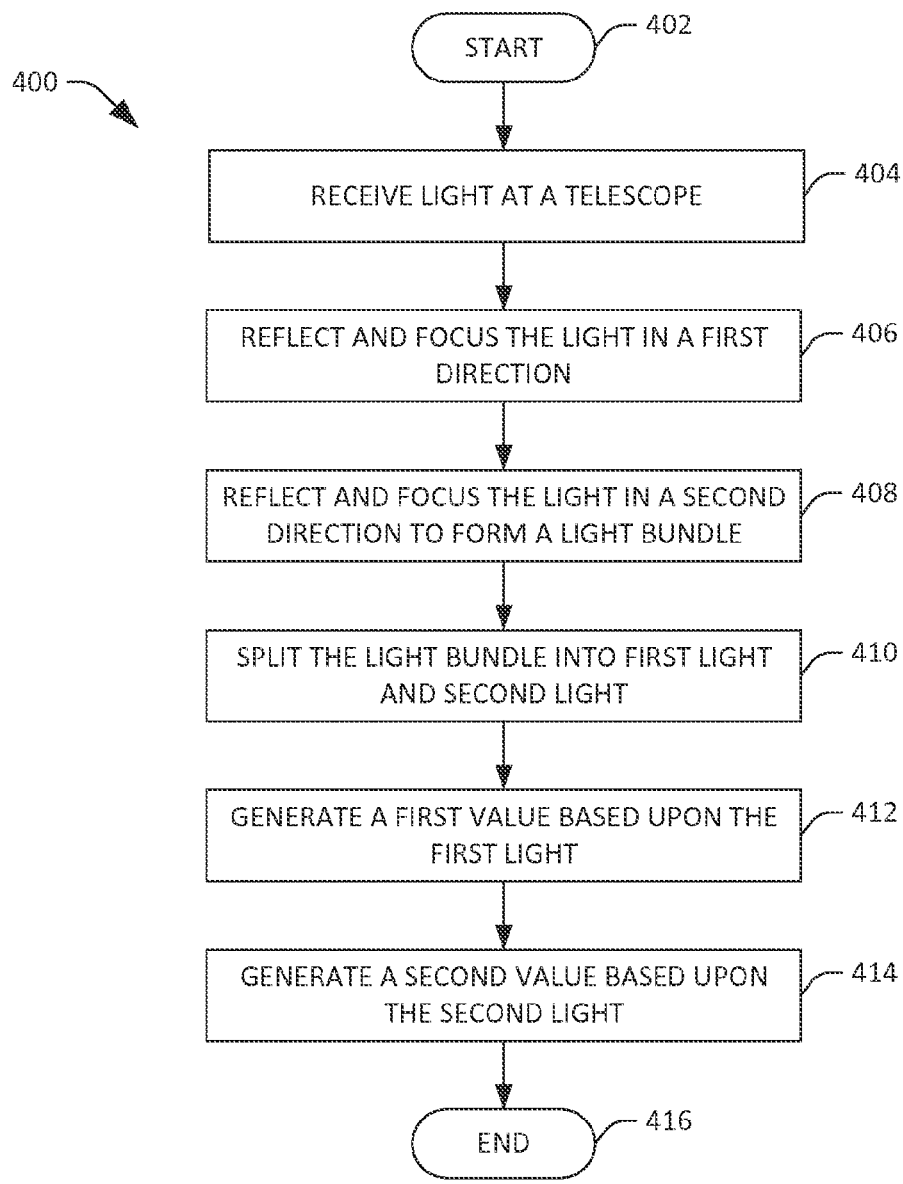
FIG. 4 is a flow diagram illustrating an exemplary methodology for operating a gimbaled multispectral imaging system.

FIG. 4 illustrates an exemplary methodology 400 for operating an imaging system. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

The methodology 400 starts at 402, and at 404 light is received at a telescope. The light travels in the telescope symmetrically about an optical axis defined by optics elements in the telescope. The light includes first light having a first wavelength and second light having a second wavelength, wherein the first wavelength is different from the second wavelength. For example, the first wavelength can be in the visible spectrum, and the second wavelength can be in the IR spectrum. At 406, the light is reflected and focused, by a primary mirror, in a first direction towards a first focal point, wherein the first focal point is positioned on the optical axis. At 408, the light is again reflected and further focused by a secondary mirror, where the light is reflected and focused in a second direction towards a second focal point that is positioned on the axis of the telescope, and where the second direction opposes the first direction. The reflections referenced above cause a light bundle to be formed, wherein the light bundle includes the first light and the second light.

At 410, the light bundle is split, wherein splitting the light bundle comprises directing the first light in the second direction and directing the second light in a third direction, the third direction being off the axis of the telescope (e.g., the third direction can be orthogonal to the first direction and the second direction). At 412, a first value is generated based upon the first light, wherein the first value is indicative of an amplitude of the first light. For example, a visible detector can be configured to generate the first value. At 414, a second value is generated based upon the second light, wherein the second value is indicative of an amplitude of the second light. For example, an IR detector can be configured to generate the second value. The methodology 400 completes at 416.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A gimbaled multispectral imaging system comprising:
   a telescope, the telescope having a proximal end and a distal end, an optical axis extending from the proximal end to the distal end, the telescope comprising:
      a primary mirror positioned proximate to the proximal end of the telescope, the primary mirror has a first focal point on the optical axis of the telescope;
      a secondary mirror positioned proximate to the distal end of the telescope, the secondary mirror has a second focal point on the optical axis of the telescope;
      a beam splitter positioned between the primary mirror and the secondary mirror and on the optical axis of the telescope, the beam splitter configured to partition the light reflected by the secondary mirror into first light and second light, wherein the first light passes through the beam splitter along the optical axis of the telescope and the second light is reflected by the beam splitter along a gimbal axis, the gimbal axis orthogonal to the optical axis of the telescope;
      a first detector that is configured to generate a first value based upon the first light; and
      a second detector that is configured to generate a second value based upon the second light.

2. The gimbaled multispectral imaging system of claim 1, wherein the first light comprises light with a wavelength between 400 nanometers and 1.2 micrometers.

3. The gimbaled multispectral imaging system of claim 2, wherein the second light comprises light with a wavelength between 1.4 micrometers and 12 micrometers.

4. The gimbaled multispectral imaging system of claim 1, further comprising:
   a hollow cross support that defines the gimbal axis and a second gimbal axis, the cross support rotatable about the second gimbal axis, the cross support comprises an upper end, wherein the telescope is attached to the cross support at the upper end; and
   a fold mirror positioned at the intersection of the first gimbal axis and the second gimbal axis in an interior of the cross support, the fold mirror redirecting the second light from the first gimbal axis to the second gimbal axis.

5. The gimbaled multispectral imaging system of claim 4, further comprising a cooling element positioned off-gimbal, the cooling element configured to cool a cold space to cryogenic temperatures, the cold space comprises the second detector.

6. The gimbaled multispectral imaging system of claim 5, further comprising:
   a second beam splitter positioned in the cold space, the second beam splitter configured to receive the second light and partition the second light into third light and fourth light, the third light having wavelengths in a third range of wavelengths, the fourth light having wavelengths in a fourth range of wavelengths, wherein the second detector generates the second value based upon the third light; and
   a third detector that receives the fourth light and is configured to generate a third value based upon the fourth light.

7. The gimbaled multispectral imaging system of claim 6, wherein the third range of wavelengths and the fourth range of wavelengths are non-overlapping.

8. The gimbaled multispectral imaging system of claim 4, wherein the hollow cross support comprises a lower end, the system further comprising an inertial reference unit that is attached at the lower end of the cross support.

9. The gimbaled multispectral imaging system of claim 8, the system further comprising first electronics attached at the lower end of the hollow cross support, the first electronics configured to generate an image based upon the first value generated by the first detector.

10. The gimbaled multispectral imaging system of claim 1, further comprising an aperture stop positioned adjacent to the primary mirror and between the primary mirror and the secondary mirror, the aperture stop having a diameter of between ten centimeters and one meter.

11. The gimbaled multispectral imaging system of claim of claim 1, the telescope further comprising a filter positioned on the optical axis of the telescope between the beam splitter and the first detector, the filter configured to receive the first light and generate filtered light based upon the first light, the first detector generates the first value based upon the filtered light.

12. The gimbaled multispectral imaging system of claim 11, the filter being a filter wheel.

13. The gimbaled multispectral imaging system of claim 11, the filter being a fixed filter.

14. A method performed by a gimbaled multispectral imaging system, the method comprising:
   receiving light, the light comprises first light having a first range wavelengths and second light having a second range wavelengths, the first range of wavelengths being different from the second range wavelengths, wherein the first range of wavelengths is in the visible spectrum and the very near infrared spectrum, and the second range of wavelengths is in the infrared spectrum;
   reflecting and focusing the light in a first direction;
   responsive to reflecting and focusing the light in the first direction, reflecting and focusing the light in a second direction, the second direction opposes the first direction;
   responsive to reflecting and focusing the light in the second direction, partitioning the light into the first light and the second light, wherein partitioning the light comprises:
      directing the first light in the second direction; and
      directing the second light in a third direction, the third direction being different from the first direction and the second direction;

responsive to partitioning the light into the first light and the second light, directing the second light to a cold space, the cold space cooled by one of a cryogenic cooler or a thermoelectric cooler;

generating a first value that is indicative of an intensity of the first light; and generating a second value that is indicative of an intensity of the second light, wherein the generating of the second value occurs in the cold space, and wherein the one of the cryogenic cooler or the thermoelectric cooler is mechanically decoupled from the cold space.

15. A method performed by a gimbaled multispectral imaging system, the method comprising:

receiving light, the light comprises first light having a first range wavelengths and second light having a second range wavelengths, the first range of wavelengths being different from the second range wavelengths;

reflecting and focusing the light in a first direction;

responsive to reflecting and focusing the light in the first direction, reflecting and focusing the light in a second direction, the second direction opposes the first direction;

responsive to reflecting and focusing the light in the second direction, partitioning the light into the first light and the second light, wherein partitioning the light comprises:

directing the first light in the second direction; and directing the second light in a third direction, the third direction being different from the first direction and the second direction;

generating a first value that is indicative of an intensity of the first light; and generating a second value that is indicative of an intensity of the second light, wherein the generating of the first value is performed on-gimbal, and wherein the generating of the second value is performed off-gimbal.

* * * * *